Figure 1:
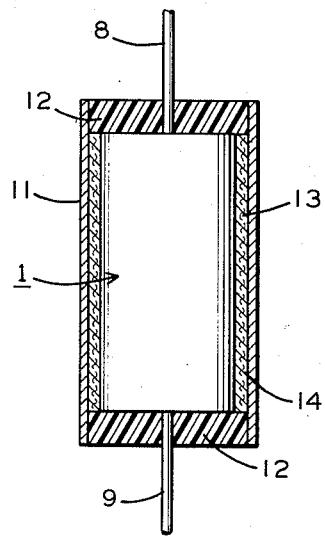

Dec. 20, 1960  S. D. ROSS  2,965,816
ELECTROLYTIC CAPACITOR
Filed April 3, 1956

*INVENTOR.*
SIDNEY D. ROSS
BY *Connolly and Hutz*
HIS ATTORNEYS

United States Patent Office 2,965,816
Patented Dec. 20, 1960

2,965,816

ELECTROLYTIC CAPACITOR

Sidney D. Ross, Williamstown, Mass., assignor to Sprague Electric Company, North Adams, Mass., a corporation of Massachusetts Filed Apr. 3, 1956, Ser. No. 575,791

3 Claims. (Cl. 317—230)

The present invention relates to electrolytic capacitors and particularly to new and improved electrolytes for electrolytic capacitors.

This application is a continuation-in-part of my copending application, Serial No. 355,159, filed May 14, 1953, and later abandoned.

The subject of electrolytic capacitors has occupied a great deal of the technical literature on electrical components for the last half centrury. The largest proportion of the research on the subject has been concerned with electrolytes which makes possible the utilization of electrolytic capacitors under a wide variety of conditions without any significant loss of properties, and without causing corrosion of the capacitor structure. At the present time, practically all electrolytic capacitors employ etched and formed anodes, generally of a valve metal, such as aluminum and tantalum. By the term "formed" is meant that the metal used for the anode has been oxidized to produce a very thin dielectric coating in accordance with conventional procedures known to the art. The early aluminum electrolytic capacitors employed "wet" electrolytes which generally consisted of solutions of inorganic salts, bases or acids in water. Of recent years these wet type electrolytes have been replaced in part with the so-called dry electrolytes which generally consist of highly viscous solutions of boric acids and/or borates dissolved in a polyhydroxy alcohol, such as ethylene glycol, and including a minor amount of water.

The dry electrolytic capacitor, while representing a substantial improvement over the prior art type of electrolytic capacitor is unsatisfactory for use under either extremely high or extremely low temperature applications, and exhibits rather poor shelf-life characteristics. These deficiencies have brought about the use of tantalum anodes because the tantalum oxide layer has greater stability under adverse conditions. The tantalum capacitors generally employ a wet type electrolyte, and through the use of electrolytes such as sulfuric acid have been suitable for operation over a wider temperature range than previously was possible. The difficulties with this type of electrolyte stem from its excessive corrosiveness which creates serious problems in sealing and venting of the capacitor, and in selection of materials for use in the fabrication of the capacitor.

It is therefore an object of this invention to produce improved electrolytic capacitors which overcome the deficiencies of the prior art types.

A further object of the present invention is to produce electrolytic capacitors operable over wider temperature ranges for extended periods without adverse changes in the electrical properties.

A still further object of the present invention is to produce an electrolyte for electrolytic capacitors which is satisfactory for high and/or low temperature applications.

Figure 2:
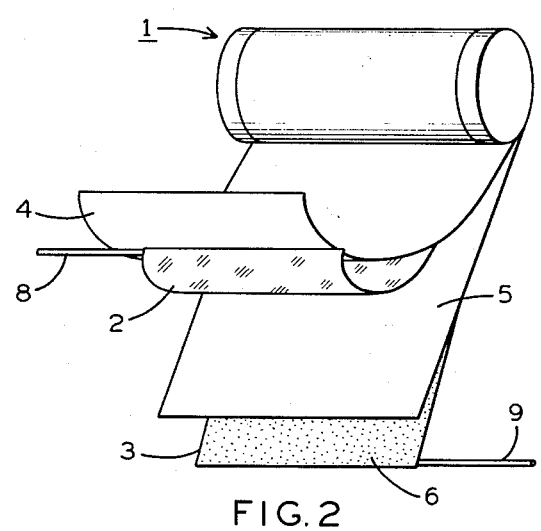
Figure 3:
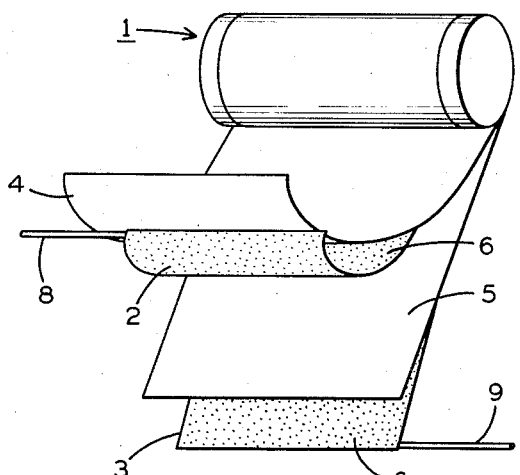
Figure 4:
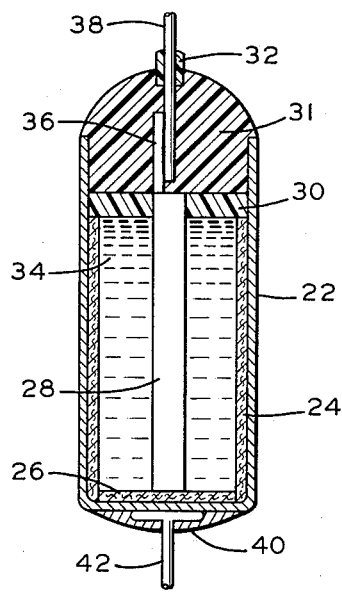

Still further objects of the present invention will be apparent from the specification and the appended drawings in which: Fig. 1 is a front elevation, in section, of a rolled foil electrode electrolytic capacitor sealed within a can; Figs. 2 and 3 are perspective views of the capacitance section of Fig. 1 removed from the can and partially unrolled to show its construction with Fig. 2 showing of the polarized type and Fig. 3 showing the non-polarized type; and Fig. 4 is a front elevation, in section, of an electrolytic capacitor having a wire anode.

The aforesaid objects have been achieved in accordance with this invention by the production of an electrolytic capacitor comprising a plurality of electrodes, at least one of said electrodes coated with an oxide dielectric layer, said electrodes physically separated and contiguous with an electrolyte comprising an ionized solute dissolved in dimethyl formamide.

Thus I have found that the disadvantages of the prior art wet and dry type electrolytic capacitors, as well as the comparatively recent tantalum capacitors employing liquid electrolytes can be overcome by the use of dimethyl formamide, which has been found to not only have an extremely wide range of temperature over which it is liquid, but also advantages over other alkyl substituted alkylamides. Electrolytes employing dimethyl formamide as the solvent can be used with any of the common film-forming valve metals particularly aluminum, tantalum, zirconium, columbium and vanadium to effect a capacitor having unique electrical properties, which are primarily manifested in wide ranges of temperature over which they are operable, unusual constancy of capacity over the operating temperature range, electrochemical stability, and non-corrosiveness. In many cases the devices are operable at voltages hitherto thought unattainable.

The amides taught in both my parent application Serial No. 355,159, filed May 14, 1953, and my copending application Serial No. 575,790, filed April 3, 1956, now abandoned, include both mono and di lower alkyl substituted lower alkyl amides. In the practice of this limited invention, the amide solvent is dimethyl formamide which is unique unto itself as a solvent realizing fully unpredicted improvements in electrolytic capacitors. The amides which are representative of the concept of the invention are dimethyl acetamide, diethylformamide, diethylacetamide, diisobutylformamide, n-ethylformamide, n-methylpropionamide, and n-methylvaleramide. It is realized of course that in the practice of this invention that the amides set forth in my copending application can be used in combination with the dimethyl formamides. Further, it is desirable for certain applications to utilize solvents of the present invention in connection with other known non-aqueous solvents such, for example, the alkyl phosphates (reference should be made to my parent application for a further listing of the compounds falling within this category which are suitable as mixed solvents with the amides of the invention). Whenever the amide solvent of the present invention is utilized in multi-solvent systems of this type, the other solvents should exercise a mutual solvent action for both dimethyl formamide and the solute employed. In many cases, the second solvent can be used to aid in bringing the solute into solution in the solvent. Care must be taken in co-solvent systems of this variety in that only a small amount (20% by weight or less) of the second solvent is used so as to obtain the advantages of the dimethyl formamide solvent, without material detrimental change of the properties of the electrolytes, and in consequence, the electrical characteristics of the capacitor.

The solutes for the dimethyl formamide electrolyte are salts of a non-metallic cation and a film-forming anion. By the term "film-forming anion" is meant an ion readily reducible at the anode so as to effect repair of the oxide film should any injury of the film occur during operation, or if used in the formation process to produce the desired dielectric film. The non-metallic cations thus include ammonium and organic substituted ammonium such as tri-n-butyl ammonium, triethanolammonium, urea radical, diethanolammonium, etc. The film-forming anion on the other hand include the acetate ion, arsenate ion, borate ion, phosphate ion, picramate ion, propionate ion, tartrate and vanadate ions. Thus salts illustrative of the solute which is in accordance with this invention include ammonium acetate, ammonium arsenate, ammonium nitrate, ammonium oxalate, pyridine-N-oxide picrate, tri-n-butyl ammonium picrate, dibutylammonium-2,4-dinitrophenylate, tri-n-butylammonium styphnate, tri-n-butylammonium-2,4-dinitrophenolate, triethanolammonium picrate, urea picrate, n-butylammonium-2,4-dinitrophenolate.

The solutes which are used in combination with the amide solvents must exhibit suitable solubility in the particular combination with which they are used in order to be useful. The broad range in which the solute should be present in the system should be from 0.1% by weight to about 20% by weight of the total system. In most applications, it has been found that the range of primary usefulness is from about 2% to about 15% by weight of the solute for any solute system. For the broad scope of the invention, it will be found that the conductivity of the electrolytes ranges from about 50 to about 10,000 ohmcentimeters.

In the form of capacitors shown in Figs. 1, 2 and 3, the capacitance section 1 is of the rolled foil type being made up of a pair of foils 2 and 3 formed of a film-forming metal, such as tantalum, aluminum, and zirconium, and spaced from one another by layers 4 and 5 of a condenser paper, such as calendered or uncalendered kraft paper. In Fig. 2, which is directed to the polarized electrolytic construction, the anode 3 has an oxide film 6 on a surface while the cathode foil 4 does not have an appreciable dielectric oxide coating. The non-polarized unit of Fig. 3 for alternating current applications has an oxide dielectric film 6 on both of the electrode foils 2 and 3. The assembly of foil and kraft paper is rolled into a compact cylinder. Metal terminals 8 and 9, preferably formed of the same metal as the foils, are fastened to the ends of the respective foils, as by spot welding or crimping.

The capacitance section 1, impregnated with the dimethylformamide electrolyte of the invention is enclosed in a tubular can 11 of a suitable non-corrosive metal such as silver or silver plated copper. The terminals 8 and 9 extend from the respective ends of the tubular can 11, passing through resinous end seals 12 which confine the electrolyte to the wound section. Positioned against the inner surface of the tubular can 11 is a tube of kraft paper 13 which is saturated with the electrolyte 14.

In the form of the condenser shown in Fig. 4, the anode is in the form of an oxide coated etched or unetched wire of the film-forming metals previously set forth. The wire may be spiralled or straight depending upon the total capacity required. The anode 28 is placed in an outer tubular can 22 of a non-corrosive metal such as silver. Within the can 22 is a spacer structure in the form of a paper tube 24 and a paper spacer disc 26 cooperating to cover the inner surfaces of said can. The anode shown here in the form of a straight wire 28 has one end placed against the spacer disc 26 and its other end filled with an encircling resin gasket 30 that can be pushed into the can. The paper tube 24 is short enough to permit the gasket 30 to be forced into the can and leave above it at least a millimeter or so of height to receive and anchor a plastic seal 26. Prior to placing the anode wire 28 into the can, the electrolyte of the invention designated 34 is placed in the container and the outer end of the anode wire 28 flattened as shown at 36. Also, before insertion of the anode wire 28, a flexible lead wire 38 of nickel for example can have its end welded to the flattened portion 36, preferably by a spot weld. To the outside of the blind end of the can 22, there is fastened by solder 40 another lead wire 42.

A number of typical examples in the practice of the invention are given below:

Example I

An electrolytic capacitor section was fabricated out of 3 mil thick aluminum foil of 5 square inches area as the anode which foil had been electrochemically etched as described in U.S. Patent No. 2,755,238, granted July 17, 1956, and electrolytically formed to 80 volts in an aqueous solution of 10% by weight of boric acid. A similarly dimensioned unetched aluminum foil was used as the cathode. The electrodes were separated by a 6 mil thick fiberglass cloth spacer. The section was vacuum impregnated at 25° C. with a solution of 2 grams of triethanolammonium picrate in 50 cc. of dimethylformamide. The unit had a capacity of 16.1 mfds. at 25° C. and a satisfactory operational temperature range of from −65° C. to 125° C. with exceptional constancy of capacity as evidenced by the following data with respect to the depressed temperature operation:

| Temperature (°C.) | Capacity (microfarads) | Dissipation Factor | R×C (ohm-microfarads) |
| --- | --- | --- | --- |
| 25 | 16.2 | 4.8 | 78 |
| 0 | | 5.3 | 86 |
| −20 | | 5.8 | 94 |
| −65 | 14.3 | 6.8 | 110 |

Example II

A similar capacitor having the construction as follows:

Anode—4.5 mil thick etched aluminum foil.
Cathode—1 mil thick silver foil.
Spacer—4 mil thick glasscloth.
Electrolyte—2.0 grams of triethanolammonium picrate dissolved in 50 cc. of dimethylformamide.
Capacity—55.3 mfds. at 25° C.

had the following electrical performance:

| Temperature (°C.) | Capacity (microfarads) | R×C (ohm-microfarads) |
| --- | --- | --- |
| 65 | 57.0 | 114 |
| 25 | 55.3 | 55 |
| −70 | 48.6 | 100 |

After operational life in excess of 1500 hours and 65° C. at 70 volts the unit measured 52.8 mfds. at room temperature and had an R×C value of 65.

Example III

A capacitor assembly of unetched tantalum as anode foil (0.5 mil thick with an area of 2 square inches) electrolytically formed to 4.0 volts in a 10% by weight aqueous solution of phosphoric acid, a similarly dimensioned unetched unformed tantalum foil as the cathode and spacers of 2 layers of 0.5 mil thick kraft paper was impregnated with an electrolyte consisting of 5% by weight of ammonium nitrate in dimethyl formamide (conductivity about 80 ohm-centimeters at 25° C.). The unit had a capacity of 30 mfds. at 25° C. and a satisfactory operational range of from below −65° C. to above 125° C. and exhibited a remarkably low dissipation factor at −65° C. and an improved temperature coefficient of capacity over that range.

Example IV

A capacitor section comparable to the structure of Fig. 4 was produced using a 25 mil diameter tantalum wire in accordance with the Rogers U.S. Patent 2,900,579, issued August 18, 1959. The wire anode of 13/16 inch in length, electrolytically formed to 6 volts, was positioned in an electrolyte of 5% by weight of ammonium nitrate in dimethylformamide contained in a silver can which served as the cathode. The unit had a capacity of about 60 mfds. at 25° C.

The present electrolytes utilized in electrolytic capacitor structures constitute a substantial improvement over prior art devices particularly, breadth of temperature range (in the order of 200 to 250 degrees), constancy of capacity over the entire range, and excellent power factor.

As many apparently widely different embodiments of this invention may be made without departing from the spirit and scope thereof, it is to be understood that the invention is not limited to the specific embodiments hereof except as defined in the appended claims.

I claim:

1. An electrolytic capacitor comprising a first oxide coated electrode, a second electrode spaced from said first electrode, and an electrolyte in contact with said first electrode and said second electrode, said electrolyte having a resistivity of from about 50 to about 10,000 ohm-cm. over a wide temperature range, said electrolyte having a salt of a non-metallic cation and a film forming anion, said salt being present from about 0.1% to about 20% by weight of the electrolyte, said electrolyte having a solvent of dimethylformamide.

2. The capacitor of claim 1 in which the salt is triethanolammonium picrate.

3. The capacitor of claim 1 in which the salt is ammonium nitrate.

References Cited in the file of this patent

UNITED STATES PATENTS

| | | |
|---|---|---|
| 732,631 | Hambuechen | June 30, 1903 |
| 2,165,090 | Clark | July 4, 1931 |
| 2,165,091 | Clark | July 6, 1931 |
| 2,759,132 | Ross | Aug. 14, 1956 |
| 2,801,221 | Robinson | July 30, 1957 |